United States Patent
Koontz

(10) Patent No.: US 7,403,719 B2
(45) Date of Patent: Jul. 22, 2008

(54) FEEDBACK CONTROL FOR FREE-SPACE OPTICAL SYSTEMS

(75) Inventor: Elisabeth Marley Koontz, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 718 days.

(21) Appl. No.: 10/610,092

(22) Filed: Jun. 30, 2003

(65) Prior Publication Data

US 2004/0264971 A1 Dec. 30, 2004

(51) Int. Cl.
H04B 10/04 (2006.01)
G02B 26/00 (2006.01)
G02F 1/00 (2006.01)

(52) U.S. Cl. ........................ 398/201; 369/237
(58) Field of Classification Search .......... 398/118–131
See application file for complete search history.

(56) References Cited

U.S. PATENT DOCUMENTS

| | | | |
|---|---|---|---|
| 5,361,155 A * | 11/1994 | Chiaroni et al. | 398/88 |
| 5,524,153 A | 6/1996 | Laor | |
| 5,532,860 A * | 7/1996 | Hershey et al. | 398/129 |
| 5,729,245 A * | 3/1998 | Gove et al. | 345/84 |
| 6,031,947 A | 2/2000 | Laor | |
| 6,097,858 A | 8/2000 | Laor | |
| 6,097,860 A | 8/2000 | Laor | |
| 6,101,299 A | 8/2000 | Laor | |
| 6,236,481 B1 | 5/2001 | Laor | |
| 6,275,626 B1 | 8/2001 | Laor | |
| 6,295,154 B1 | 9/2001 | Laor et al. | |
| 6,320,993 B1 | 11/2001 | Laor | |
| 6,342,960 B1 * | 1/2002 | McCullough | 398/79 |
| 6,400,858 B1 | 6/2002 | Laor | |
| 6,430,328 B1 * | 8/2002 | Culver et al. | 385/16 |
| 6,430,332 B1 | 8/2002 | Laor et al. | |
| 6,466,711 B1 | 10/2002 | Laor et al. | |
| 6,804,412 B1 * | 10/2004 | Wilkinson | 382/278 |
| 6,819,874 B2 * | 11/2004 | Cheng et al. | 398/129 |
| 2002/0079432 A1 | 6/2002 | Lee et al. | |
| 2003/0001953 A1 | 1/2003 | Rancuret | |
| 2004/0208639 A1 * | 10/2004 | Melzer et al. | 398/183 |

* cited by examiner

Primary Examiner—Shi K Li
(74) Attorney, Agent, or Firm—Wade James Brady, III; Frederick J. Telecky, Jr.

(57) ABSTRACT

Disclosed is a system and method for aligning a free-space optical signal in an optical system having a light modulator having an array of pixels. In this system and method, certain pixels of the light modulator array are initially assigned for the modulation of the free-space optical signal. An alignment optical signal is generated and monitored, to determine whether the optical system components are properly aligned. The alignment optical signal is generated and propagated along a path that is substantially aligned with the path of the free-space optical signal. Detector elements are used to monitor the position (and shifts in the position) of the free-space optical signal. By reassigning the pixels of the array of the light modulator at the direction of a control system, it is possible for the light modulator to compensate for shifts in the alignment of the optical components within the system.

25 Claims, 3 Drawing Sheets

FEEDBACK CONTROL FOR FREE-SPACE OPTICAL SYSTEMS

TECHNICAL FIELD

Systems for aligning free-space optical components and subsystems, and particular such subsystems employing pixel-based light modulation.

BACKGROUND

In an optical system employing free-space optical components with pixel-based light modulation, such as reflective spatial light modulators or reflective or transmissive liquid crystal displays, it is important that the light beam be properly aligned with the modulating elements. The light beam also must be properly aligned with the other optical components within the optical system. Mechanical alignment is presently used to position the components in a free-space optical system such that proper alignment is established. Such mechanical alignment can be a time-consuming and laborious process. Typically, the assembler of the system monitors received and/or transmitted power levels in various stages within the system as the positioning of the components is tweaked using mechanical, piezoelectric, or other forces to move components into alignment.

Not only must free-space optical systems and subsystems be initially configured for proper alignment, but such free-space optical systems are prone to instability in their alignment due to, for instance, environmental temperature variation and corresponding Coefficient of Thermal Expansion ("CTE") mismatches between components made of differing materials within the systems. Thus, over temperature ranges required for operation, e.g., 0-70° C., individual lenses, gratings, mirrors and other components within an enclosure may shift by differing amounts and in different directions. Such shifting may come from the above components, the mounting enclosures and/or adhesives capturing the components having different CTEs.

Other techniques for dealing with environmental stresses and variation include active temperature control and hermetic sealing of components and/or systems. These techniques, however, can be difficult and/or expensive depending upon the size and other system or component design factors.

SUMMARY

Disclosed in this application are embodiments for the dynamic alignment of light beams by using the flexibility of a pixel-based light modulator or a light modulator having individually controllable elements or pixels. The light modulator may be a Deflectable Mirror Device ("DMD") or it may be a Liquid Crystal Display ("LCD") or another type of device. Embodiments of free-space optical systems are disclosed in this application in which an optical system input is provided, which may be a free-space optical signal or may be an optical signal contained within, for example, an optical fiber. At some point within the free-space optical system, the input optical signal becomes a free-space optical signal and is modulated by a pixel-based light modulator. The modulator operates under control of a control circuit, which communicates with the light modulator through, for example, optical or electrical communication. Under control of the control circuit, the modulator performs useful optical functions such as the projection of an image for use in display or printing, filtering of an optical signal, switching of an optical signal, or other functions. These functions can be best accomplished, however, if the light beam is properly aligned within the free-space optical system.

In embodiments of this application, the fact that the modulator comprises an array of switchable elements is used to compensate for misalignments occurring either initially or during the operation of the system. For example, if a modulator has a square array of pixels having 12 rows and 10 columns, and if it is detected that the free-space optical signal is striking the modulator not at its originally aligned location but 2 rows below the originally aligned location, it is possible to adjust the mapping of the pixels to the signals being modulated to compensate for the misalignment. This flexibility accordingly allows the dynamic adjustment of system alignment or a compensation for shifts in alignment in the free-space optical system. A similar approach can be taken if the optical beam is detected to be horizontally displaced from the originally aligned position such that it is striking two columns to the right or left of the originally aligned position. Thus, the control circuitry operates to re-map or re-assign rows and columns of the modulator depending on the detected shifts in alignment.

In order to detect the shifts in alignment such that these changes can be compensated for, embodiments described in this application provide for a separate and parallel optical alignment optical signal. The alignment optical signal may be formed by a light emitting device such as semiconductor laser that is positioned to provide a beam—an alignment optical signal—aligned with the free-space optical signal traveling through the optical system. Thus, by passing the alignment optical signal though the same components and on a parallel path relative to the free-space optical signal, it is possible to provide a separate detector that can be used to detect alignment shifts occurring by positioning an optical detector at the tail end of the signal path through the optical system.

Figure 1:
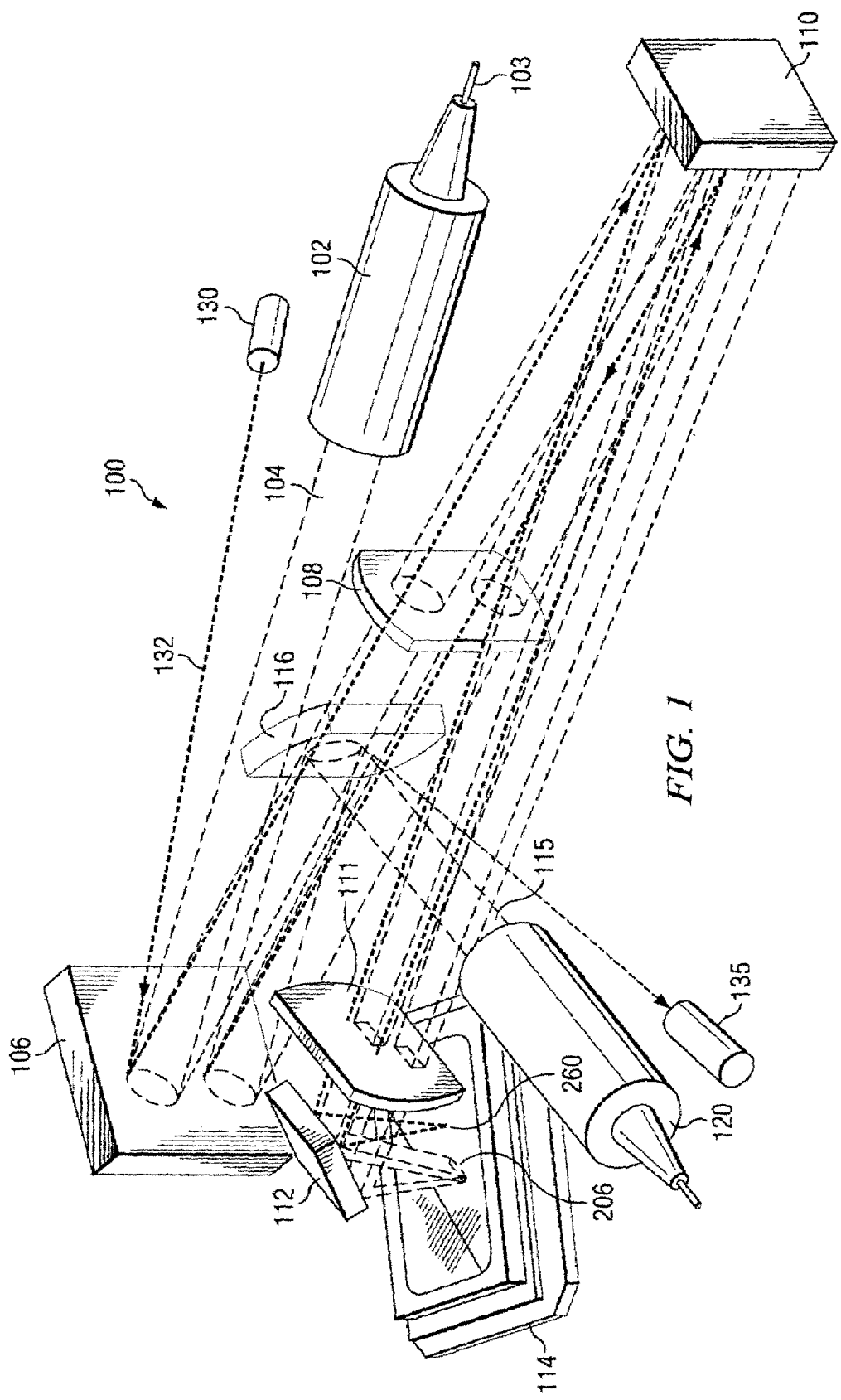
FIG. 1 is a perspective view of an optical system employing alignment circuitry for detecting and correcting for misalignment in free-space optical system components.

All of these drawings are drawings of certain embodiments. The scope of the claims is not to be limited to the specific embodiments illustrated in the drawing and described below.

DESCRIPTION OF THE EMBODIMENTS

FIG. 1 is a three-dimensional perspective view of an embodiment of a free-space optical system 100. In this particular embodiment, there is provided an input 102, which is shown in the figure as an input fiber collimator 102, but might also be a focusing lens or another type of optical coupler. An optical signal enters the optical system at the input 102 and becomes a free-space optical signal 104 within the system 100. While traveling through the optical system 100, the free-space optical signal 104 may be filtered, reflected, focused, split, polarized, or otherwise acted upon. In the example of FIG. 1, the free-space optical signal 104 is reflected from grating 106, which will reflect different wavelength components of the optical signal 104 along desired paths. In this embodiment, the wavelength components travel on slightly diverging sub-paths through projection lens 108 and onto mirror 110. From the mirror 110, the free-space optical signal 104 comprising slightly separated wavelength components is reflected towards a DMD fold mirror 112, which reflects the free-space optical signal 104 onto the face of a DMD light modulator 114, or other Spatial Light Modulator ("SLM"), or other light modulator such as an LCD. The separation of the wavelength components allows the modulator 114 to separately modulate the multiple wavelength components. In this embodiment, as in most optical system embodiments, proper alignment of the optical signals to the components they interact with is important. The concepts described in this application will accordingly be applicable to many different types of optical systems. The scope of the claims should not be limited to any specific embodiment disclosed in the application, but instead should be determined according to the language of the claims themselves.

Still referring to FIG. 1, the light signal 104 is modulated by the light modulator 114 and is directed back again to the mirror 112 as a modulated free-space optical signal 115. From the mirror 112, the modulated optical 115 signal travels along a similar path to the incoming free-space optical signal 104, but in an opposite direction. Accordingly, the modulated free-space optical signal 115 is reflected from the mirror 110 back through the lens 108 and onto the grating 106. The grating 106 re-combines the multiple wavelengths, and another mirror 116 is provided along the path of the modulated free-space optical signal 115 such that the path is diverted from being substantially aligned with the incoming free-space optical signal 104. From the mirror 116, the modulated free-space optical system 115 is reflected towards an output 120 from the free-space optical system 100.

Maintenance of proper alignment of the system 100 shown in FIG. 1 or of another free-space optical system is important for optimal operation of such systems. This alignment is first established by the careful assembly of the components in the optical system, which includes careful adjustment of the components, typically while monitoring system performance. Embodiments described in this application provide for the maintenance and fine-tuning of the optical signal alignment—without requiring physical adjustment of the hardware components. Since arrays of pixel elements are used for modulation of the free-space optical signal 104 in the embodiments described herein, it is possible to optimize and tune the optical performance of the system 100 by logically shifting the pixels assigned to the free-space optical signal 104.

The embodiments described herein provide for separate alignment circuitry by which the alignment of the components in the free-space optical system 100 can be detected and optimized, and by which the optical modulation characteristics and pixel assignments of the light modulator 114 can be dynamically changed in order to compensate for misalignment within the system. In the embodiment shown, a light emitter 130, such as a semiconductor laser, provides an alignment beam 132 substantially aligned with the free-space optical signal 104 and modulated free-space optical signal 115. A detector 135 is positioned near the output of the free-space optical system 100. The detector 135 receives the alignment beam 132 after it has traveled through the system 100 aligned with the free-space optical signal 104 and the modulated free-space optical signal 115. The alignment beam or alignment optical signal 132 generally follows the path of the free-space optical signal 115, and in many cases will be reflected by or transmitted through the same optical elements as the free-space optical signal 115.

To facilitate the handling of the alignment optical signal 132, the modulator 114, if reflective, may also include a non-pixelated, non-modulating reflective surface for the reflection of the alignment optical signal 115. If the modulator 114 is transmissive, it may include a non-pixelated, non-modulating transmissive area for the passing through of the alignment optical signal 115. The emitter 130 and detector 135 may be aligned at the time of the optical system assembly such that the initial optical profile on the detector 135 is known. Thus, if the optical alignment begins to drift, it can be determined what compensation if any should be applied within the system.

Figure 2:
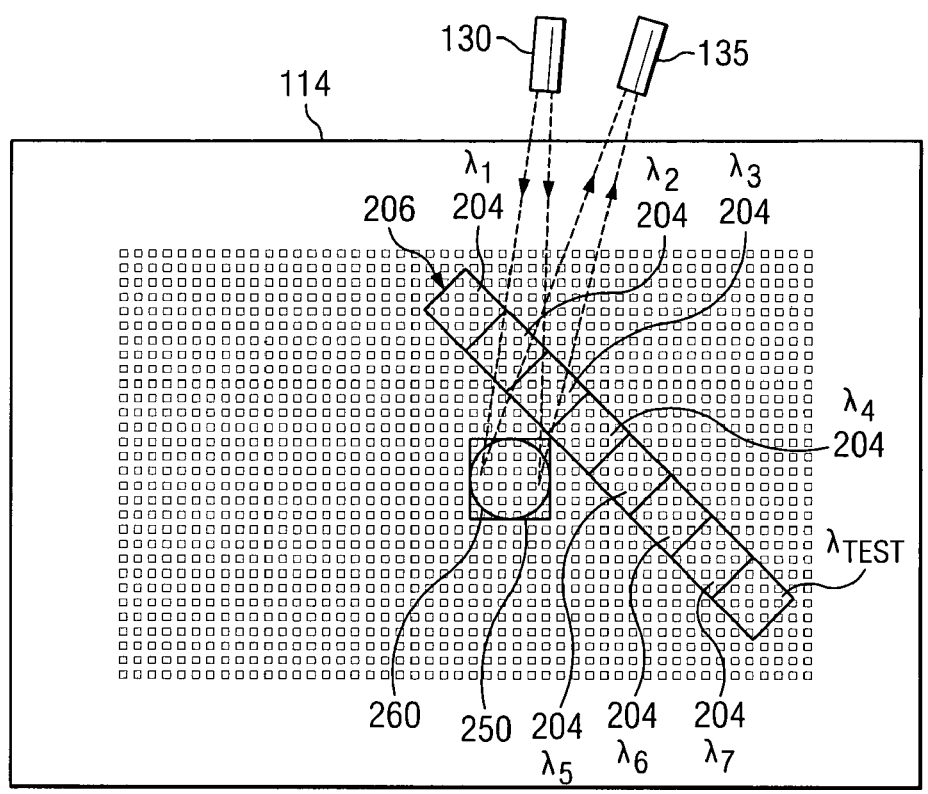
FIG. 2 is a top view of an SLM onto which a band of channels has been directed.

FIG. 2 is a top view of the DMD 114. Shown on FIG. 2 and on the surface of the DMD 114 are a plurality of individual pixel elements 202. These individual pixel elements are, in one embodiment, individual DMD mirrors, which can be individually switched on and off by circuitry underlying the DMD pixels on a semiconductor substrate. In such an embodiment, the array may be a 768×1024 array, although many other array dimensions could be used. Besides DMD-type spatial light modulators, the principles employed here could also be applied to liquid crystal displays or other types of spatial light modulators.

Also shown on the surface of the DMD 114 are a number of segments or sub-arrays 204 of pixels. The segments represent divisions of the area in which the multiple channels of the incoming free-space optical signal 104 can strike the surface of the DMD 114. In this description of the embodiments, the area in which the plurality of channels of the optical signal strike the DMD will be referred to as the band 206, whereas the sub-arrays in which the channels strike are referred to as segments 204. Thus, as shown here, there would be a segment 204 devoted to receiving a first channel, $\lambda_1$, a second channel $\lambda_2$, a third channel $\lambda_3$, and so on, up until an nth channel $\lambda_n$. Within each segment 204, in general the intensity distribution will be Gaussian in shape due to the mode of the single-mode fiber input to the collimator 102. Although FIG. 2 shows each individual channel as being contained within a single band 206, and striking within a single segment 204, it is also possible to have the $1/e^2$ area (91% of the power) for each wavelength overlapping relative to each other or spilling over into adjacent segments.

Initially upon system start-up, the different wavelengths within the band 206 will be distributed across the surface of the DMD 114. At this time, it will be possible to establish a reference point for the band 206, for individual wavelengths within the band, and for a separate alignment signal, if a separate alignment signal is employed in the system. Whether the alignment signal 132 or a separate wavelength of the optical signal 104 or a diffracted order of the optical signal off of the DMD 114 is used for alignment, initially a reference point will be established for the initial optical signal alignment. The reference point would generally be a point of maximum intensity for the alignment signal 132, be it a separate alignment signal 132 or one extracted from a diffracted order of an optical signal. Thereafter, environmental factors causing movement of the different elements within the system 100 would affect the alignment signal 132 in a nearly identical manner as the optical signal 104, the projection of which forms the band 206 and its multiple wavelengths, because the alignment signal 132 and the optical signal 104 travel along essentially the same path through the system 100.

FIG. 2 further shows, absent intervening optics such as illustrated in FIG. 1, the use of an optical emitter 130 that provides an alignment signal 132, which forms a spot 260 in an alignment area 250 on the DMD surface 114. The optical alignment detector 135 is provided to sense the intensity of the alignment signal reflected off of the DMD surface 114. By turning on and off subsets of mirrors or single mirrors to determine the center of the spot 260 within the alignment area 250 through the sensing of the relative signal intensity at the detector 135, it is possible to see where the alignment signal is falling relative to the reference point. By shifting the pixels of the DMD 114 that are assigned to the band 206 and the multiple wavelength areas 204 within it, it is possible to compensate for drifting alignment or other misalignment within the system 100. This figure also shows another possible embodiment in which a "test" wavelength, $\lambda_{test}$, is used from the main source optical signal transmitted through the fiber 103 and collimator 102. In this way, alignment can be done without the need of a separate optical alignment source 130. The use of a separate "test" wavelength or a separate emitter allows for on-the-fly adjustment of the pixel assignments within the DMD without interfering with the signal wavelengths; it is also possible to use one of the signal wavelengths ($\lambda_1, \lambda_2, \lambda_3 \ldots \lambda_n$) by temporarily breaking that signal and testing the intensity of the light output for that wavelength while turning "on" and "off" different groups of pixels in the area of the DMD surface in which the particular wavelength spot is expected to strike.

While certain system arrangements are described herein, there are a number of possible arrangements for the various components in such a system 100.

First, as described above, there can be provided an alignment signal source 130 that provides an alignment signal 132 propagating in parallel to the optical signal 104 and modulated optical signal 115, wherein the optical signal is received at a single element detector 135. The relative position of the alignment signal can be determined by rotating through certain patterns or pixels to determine the optical response for the respective patterns or pixels by monitoring the intensity of the light striking the detector 135.

Second, an alignment signal source 130 can provide an alignment signal that can be propagated in parallel to the optical signal 104 and modulated optical signal 115 and on to a pixelated detector 135. The pixelated detector can determine the peak location pixel on the detector 135 of the optical signal relative to a reference point, and adjustments in alignment can be made accordingly.

Third, a test wavelength $\lambda_{test}$ can be provided as a diffracted wavelength from the optical signal 104. The relative position of the $\lambda_{test}$ signal can be determined by providing an optical detector in line with the $\lambda_{test}$ signal as it is directed from the DMD surface 114. The optical detector might be a single element or pixelated detector 135. For the single element detector 135, as described above in the first example, certain patterns of pixels on the modulator 114 can be applied to determine the effect those patterns have on the optical performance (as an example of the application of patterns to determine characteristics of an optical system, see commonly assigned U.S. Patent Publication 20030001953, to Rancuret et al., which is hereby incorporated by reference herein). For a multiple element or pixelated detector 135, patterns might not be applied but the relative intensity of light striking the individual pixels of the detector 135 can be used to detect relative shifts of the optical signal.

Fourth, diffracted components of the optical signal 104, such as might be generated during a pixel reset of the modulator 114, can be monitored by a single element or pixelated detector 135. As described above, for example, a detector 135 can be positioned to receive the first diffracted order of an optical signal and to detect alignment shifts therein. The third and fourth examples above are accomplished without the use of an additional alignment signal source 130.

Figures 3A, 3B:
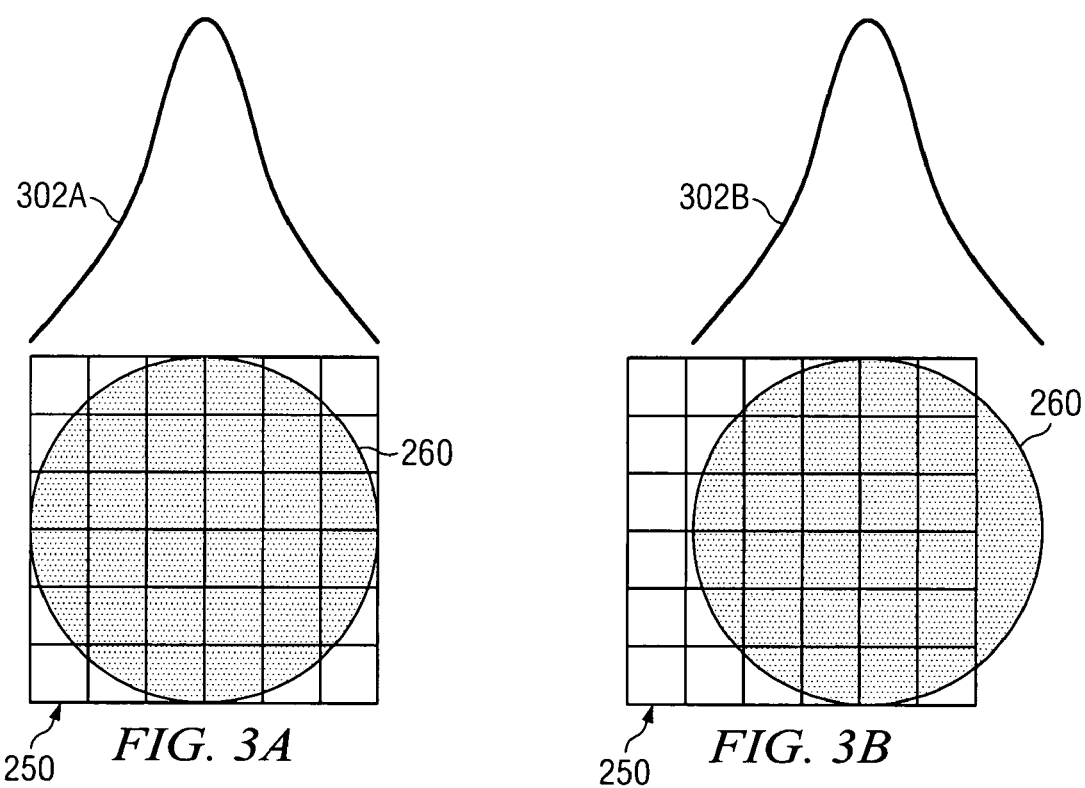
FIGS. 3A-3B are mappings of light beam intensity onto a DMD surface in an aligned and nonaligned condition.

FIGS. 3A-3B illustrate optical profiles 302A, 302B for aligned and misaligned optical signals on the detector 135. FIG. 3A thus shows the optical profile of an alignment optical signal 132 in optimal alignment, whereas FIG. 3B shows the alignment signal to be shifted a little more than one pixel to the right. In this example, the detector 135 might be a 6×6 array of light detection elements or pixels 204, which are operable to detect the light intensity of the incoming alignment signal 132. In FIG. 3A, as can be seen by the optical light intensity spectrum 302A which in this example is a circularly symmetric signal, the maximum intensity is located at the center of the 6×6 pixel array in the detector of 135. If the rows and columns of the array of the detector 135 were numbered, this maximum light intensity would be located at pixel 3,3. In FIG. 3B however, when the alignment signal 132 is shifted to the right, the maximum light intensity is instead located at pixel 4,3, where 4 is the column number and 3 is the row number.

Figure 4A:
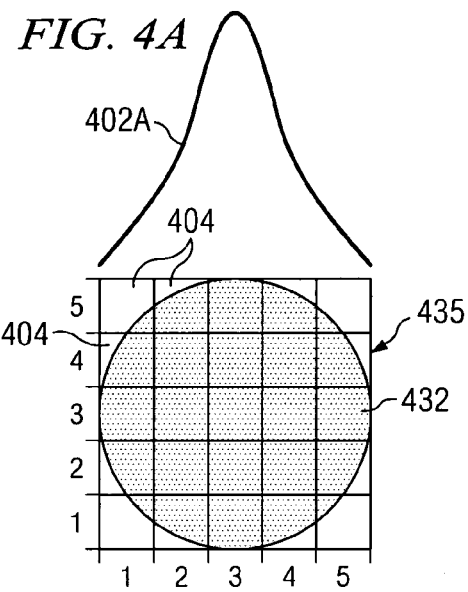
FIGS. 4A-4B are mappings of light beam intensity relative to the pixels of a detector array.
Figure 4B:
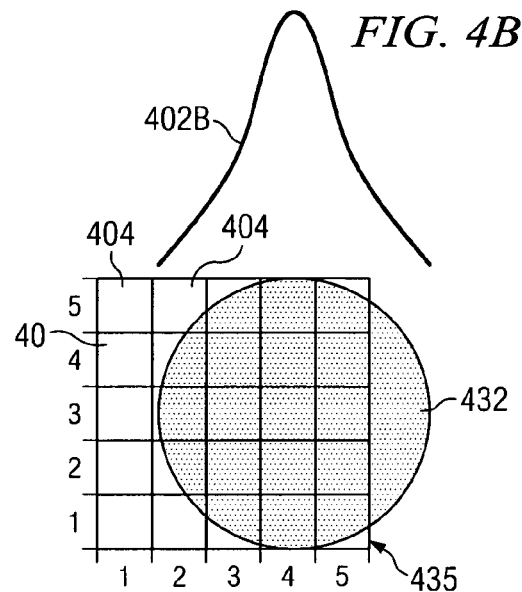

FIG. 4A-4B illustrate optical profiles 402A, 402B for aligned and misaligned optical signals on the detector 135. FIG. 4A thus shows the optical profile of an alignment optical signal 132 in optimal alignment, whereas FIG. 4B shows the alignment signal to be shifted a little more than one pixel to the right. In this example, the detector 135 might be a 5×5 array of light detection elements or pixels 404, which are operable to detect the light intensity of the incoming alignment signal 132. In FIG. 4A, as can be seen by the optical light intensity spectrum 402A, which in this example is a circularly symmetric signal, the maximum intensity is located at the center of the 5×5 pixel array in the detector of 135. If the rows and columns of the array of the detector 135 were numbered as shown in the figure, this maximum light intensity would be located at pixel 3,3. In FIG. 4B, however, when the alignment signal 132 is shifted to the right, the maximum light intensity is instead located at pixel 4,3, where 4 is the column number and 3 is the row number.

Using information gleamed from the detector 135, control signals (not shown, see FIG. 5) can be provided whereby the modulation provided by the light modulator 114 can be adapted to compensate for this misalignment. In other words, if the alignment signal 132 is shifted one pixel to the right, as shown by the graph of the spectrum 402B in FIG. 4B, it may be assumed that the communication signals—the free-space optical signal 104 and modulated free-space optical signal 115—are misaligned by the same distance. This assumption depends on the alignment signal having similar mountings and a similar path relative to the free-space optical signal 104 and modulated free-space optical signal 115. Even if the alignment components 130, 135 and signal 132 are not completely parallel to or even aligned with the regular optical system components in this embodiment, it may still be possible to compensate according to the shifts occurring in the alignment signal 132 based on proportional relative adjustments or other known relationships. Accordingly, it may be possible to shift the modulation of the free-space optical signal 104 with the light modulator 114 by one or more columns within that modulator 114, such that the modulation of the signal 104 is essentially unaffected by alignment shift.

By dynamically controlling the modulator 114 to compensate for misalignments by shifting rows and or columns of those modulators, misalignments which occur over the specified operating range for the equipment can be mitigated. In other words, over temperature ranges typically required for optical systems, e.g. 0 to 70 degrees C., individual lenses, gratings, mirrors, etc., within an enclosure may shift by different amounts and in different directions due to thermal expansion coefficients of the component materials, the component mounting materials, the subsystem box materials, and other elements of the system.

Specifically, the idea in the pixel-based light modulator is to reassign pixels within the modulator block designated for the modulation data signals specified for the particular cells within the modulator. As an alternative to providing an additional emitting device such as a semiconductor laser 130, it is possible to monitor the alignment status of a pixel-based free-space optical subsystem by detecting the power reflected to the first diffracted order or other diffraction order during pixel reset sequences or from other reflections off of the modulator. This approach would enable such detection to occur without the provision of the separate emitting device 130. Diffraction orders such as this would be provided by, for example, a DMD light modulator at wavelengths in the near-IR Regime (e.g. 1400/1700 mm). In the near-IR regime, the DMD behaves as a grating, and thus the reflected light is channeled into diffracted orders. By placing a detector in the path of the first or other diffracted order, the power may be monitored. By selecting a specific pixel block assigned to a predetermined optical data signal (via a detector array or modulator), the power channeled into the first diffraction order may be monitored during a reset sequence for total power, optical misalignment, in the light. This monitoring of the diffracted order alignment can be accomplished using either a single detector (with shifting pixel patterns imposed on the modulator) or using a pixelated alignment signal detector. Thus, it may be possible to use a DMD surface as a diffraction grating specific to the wavelength of interest or to known harmonics of that wavelength, essentially to pick up a derived alignment signal from the normal communications signal. This approach makes use of the properties of the DMD as a diffraction grating as is described in commonly owned U.S. Patent Publication No. U.S. 2002/0079432 A1 to Benjamin Lee et al., entitled "Two-Dimensional Blazed MEMS Grating," which is hereby incorporated by reference herein. By using this approach, for example, rather than providing the separate alignment beam, a detector can be placed in a separate optical path upon which the alignment from a diffraction order from the free-space optical signal can be detected.

The optical systems towards which these described embodiments could be applied include optical networking filters, modulator-based printing devices or display devices, sheet optical filtering systems, or other optical systems requiring free-space light propagation. The alignment beam 132, which travels from the emitter up 130 to the detector 135 will proceed in parallel with the free-space optical signal 104 and the modulated free-space optical signal 115, and accordingly will pass over different pixels of the modulator 114. In the described embodiments the pixels stricken by the alignment signal 132 on the modulator 114 will be close to the pixels used to modulate the free-space optical signal 104.

While this approach is described above with respect to making dynamic adjustments for shifting alignments within the optical system, it would be possible to apply the concepts described to correct larger misalignments or to at least compensate for larger alignments until larger adjustments can be made for example through the movement of mirrors, collimators, or other optical components within the system. In situations where the reassignment of pixels within the modulator is unable to completely compensate for the misalignments which are occurring, it is possible that a software flag could be alerted such that the overall system management is made aware of the misalignment condition such that an operator can then perform service on the unit and return the unit to alignment through adjusting the optical components within the system.

Figure 5:
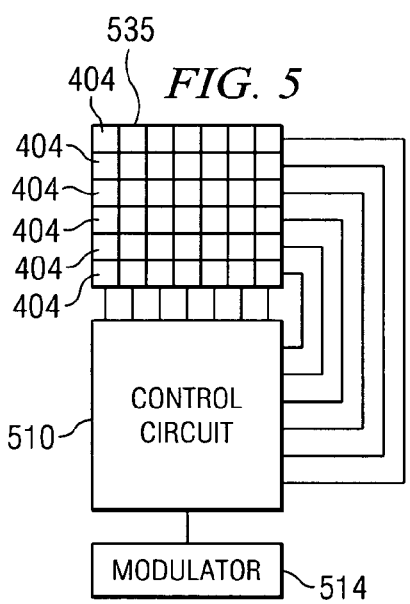
FIG. 5 illustrates an exemplary optical system and control circuitry.

FIG. 5 is a block diagram of circuitry that can be used to interface with the detector 535 and the light modulator 514 to compensate for misalignments occurring in the system. In this embodiment, the detector array 535, divided into elements 404, provides light intensity signals to control circuitry 510. Given the dynamic nature of the modulator 514, the control circuitry 510 can dynamically reassign groups of pixels of the modulator 514 to modulate the different wavelength bands of the free-space optical signal 104.

Figure 6:
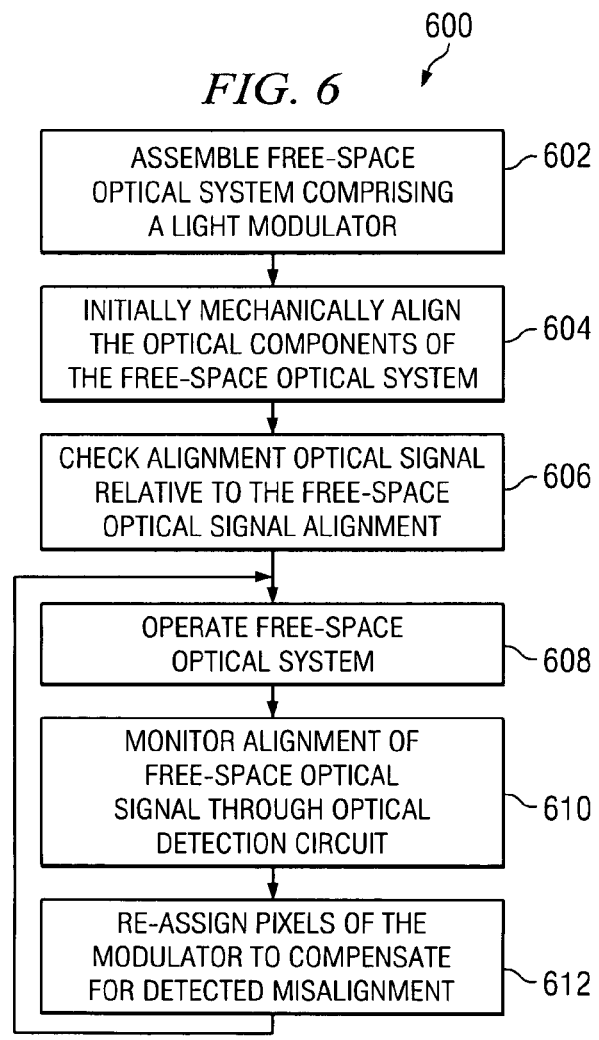
FIG. 6 is a flow chart showing an exemplary method for operation of the free-space optical system.

FIG. 6 is a flow chart showing a possible process 600 for operation of the free-space optical system 100 using the alignment techniques described above. The process 600 begins with the assembly 602 of the free-space optical system 100. The optical system itself has multiple optical components to be aligned with the free-space optical signal 104 and modulated free-space optical signal 115. The components may initially be mechanically aligned within the system 100 according to step 604, although it may be possible to design the system with sufficient precision to allow dynamic alignment (see block 612, below) without an initial mechanical alignment. After initial alignment, it may be then desirable to check the alignment of the alignment signal to the detector 135, 535 in accordance with block 606. By doing this when the system has been optimally aligned, it may therefore become more feasible to detect shifts in alignment from the optimal optical alignment condition. In a manner of speaking, this action "registers" the position of the detected alignment signal 132 on the detector 135, 535 at the time of optical alignment. The alignment signal 132 may either be a signal provided by a separate alignment signal source 130 or by a diffraction order of the free-space optical signal 104 diffracted off of the modulator 114, 515 during a reset sequence or at another time.

Still referring to FIG. 6, once the system 100 has been initially assembled, aligned, and/or "registered," the system 100 may be operated in accordance with block 608 of the process 600. During the time of that operation, the alignment of the free-space optical signal 104 and modulated free space optical signal 115 may be monitored in accordance with block 610. At block 612, according to any detected shifts in alignment at block 610, as detected at detector 135, 535 in communication with the control circuit 510 (see FIG. 5), the pixels of the modulator 114, 514 can be re-assigned or shifted in their assignment in accordance with the detected shift in alignment. This process continues in a loop from 612 back to 608 throughout the operation of the free-space optical system 100. The process may be continuous, continual, or periodic.

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical system comprising:
   a) an optical signal input, the optical signal input operable to receive an optical signal and to provide as an output a free-space optical signal;
   b) a light modulator, comprising a plurality of modulator elements wherein each modulator element is operable to modulate light, positioned to receive the free-space optical signal and operable to modulate the free-space optical signal based upon modulation control signals to provide a modulated free-space optical signal;
   c) a control circuit in communication with the light modulator, the control circuit operable to generate the modulation control signals for operating the plurality of modulator elements for modulation of the free-space optical signal; and
   d) an optical alignment detection circuit in electrical communication with the control circuit, wherein the optical alignment detection circuit detects misalignment in the optical system and together with the control circuit is operable to reassign data signals specified for one set of the modulating elements to another set of the modulating elements so as to adjust the modulation control signals to compensate for such misalignment; and
   e) wherein the optical alignment detection circuit comprises an array of optical detection elements;
   f) wherein the control circuitry is operable to determine from electrical signals generated by the optical detection elements the approximate location of an alignment optical signal intensity peak striking the optical detection elements; and
   g) wherein the control circuitry is operable to adjust the modulation control signals by reassigning pixels within the light modulator according to the location of the alignment optical signal intensity; and
   h) wherein the reassigning pixels within the light modulator is achieved by shifting control of pixels within the light modulator by a fixed number of pixels, wherein the fixed number is responsive to the number of optical detection elements that the alignment optical signal intensity peak is located from a reference point.

2. The system of claim 1 wherein the optical signal input is via an input fiber collimator.

3. The system of claim 1 and further comprising a light emitting device which generates an alignment optical signal which follows a path that is substantially aligned with the free-space optical signal and the modulated free-space optical signal, wherein the alignment optical signal is received by the optical alignment detection circuit at a point substantially adjacent to the modulated free-space optical signal.

4. The system of claim 1 wherein the optical alignment detection circuit receives an alignment optical signal originating from at least a portion of the free-space optical signal.

5. The system of claim 4 wherein the alignment optical signal comes from a diffraction order of the free-space optical signal interacting with an optical component in the system.

6. The system of claim 5 wherein the optical component is selected from the group consisting of a mirror, a grating, a lens, and a light modulator.

7. The system of claim 5 wherein the alignment optical signal comes from a diffraction order of the free-space optical signal interacting with the light modulator.

8. The system of claim 1 wherein the light modulator comprises a reflective light modulator.

9. The system of claim 8 wherein the light modulator comprises an army of micromirrors.

10. The system of claim 8 wherein the light modulator comprises an array of liquid crystal cells.

11. The system of claim 1 wherein the light modulator comprises a transmissive light modulator.

12. The system of claim 11 wherein the light modulator comprises an array of liquid crystal cells.

13. The system of claim 1 wherein the optical system comprises a dynamic optical filter.

14. The system of claim 13 wherein the dynamic optical filter is operable for use in optical communications.

15. The system of claim 1 wherein the optical system comprises a digital projector.

16. The system of claim 1:
   wherein the plurality of modulator elements comprises an array of pixels;
   wherein the array of pixels is greater in size than a spot size of the free-space optical signal on the light modulator; and
   wherein the control circuit assigns a subset of the array of pixels to modulate the free-space optical signal according to a position of a spot of the free-space optical signal as estimated by the alignment optical detection circuit.

17. The system of claim 1 wherein the light modulator further comprises a non-modulating reflective surface for the reflection of an alignment optical signal.

18. The system of claim 1 wherein the light modulator further comprises a non-modulating transmissive area for the transmission of an alignment optical signal.

19. An optical system comprising:
   a) an optical signal input, the optical signal input operable to receive an optical signal as an input and to provide as an output a free-space optical signal;
   b) a light emitting device which generates an alignment optical signal which follows a path substantially aligned with the free-space optical signal;
   c) a light modulator comprising a plurality of pixels wherein each pixel is operable to modulate light, the light modulator positioned to receive the free-space optical signal and the plurality of pixels operable to modulate the free-space optical signal based upon modulation control signals to provide a modulated free-space optical signal, and the light modulator further operable to reflect the alignment optical signal such that it continues in a path that is substantially aligned with the modulated free-space optical signal;
   d) a control circuit in communication with the light modulator, the control circuit operable to generate the control signals for operating the plurality of pixels for modulation of the free-space optical signal; and
   e) an optical alignment detection circuit in electrical communication with the control circuit, wherein the optical alignment detection circuit is operable to receive the alignment optical signal and to detect misalignment in the optical system, whereby the optical detection circuit provides signals to the control circuit such that the control circuit is operable to reassign data signals specified for one set of the pixels to another set of the pixels so as to adjust the modulation control signals to compensate for such misalignment
   wherein the plurality of pixels of the light modulator comprises an array of pixels, and wherein the compensation performed by the modulator for the misalignment is a reassignment of the pixels in the array;
   wherein the array of pixels is greater in size than a spot size of the free-space optical signal on the modulator, and wherein the control circuit assigns a subset of the array of pixels to modulate the free-space optical signal according to a position of a spot of the free-space optical signal as estimated by the alignment optical detection circuit; and wherein the alignment optical detection circuit is an array of optical detection elements, and wherein the assignment of the subset of the array of pixels is done in proportion to a shifting of a peak of the alignment optical signal on the array of optical detection elements relative to a reference point.

20. A method for aligning a free-space optical signal in an optical system comprising a light modulator having an array of pixels, wherein each pixel in the array is controllable in response to a control signal to modulate light, the method comprising:
   a) assigning control signals to a certain corresponding group of pixels of the array of pixels for the modulation of the free-space optical signal;
   b) generating an alignment optical signal with a light emitting device wherein the alignment optical signal follows a path that is substantially aligned with the free-space optical signal;
   c) monitoring the position of the alignment optical signal using an optical alignment detection circuit wherein the alignment optical signal is received by the optical alignment detection circuit at a point substantially adjacent to the modulated free-space optical signal; and
   d) reassigning the control signals to a different corresponding group of the pixels of the array for the modulation of the free-space optical signal according to the detected position of the alignment optical signal striking the optical alignment detection circuit.

21. The method of claim 20 wherein the assigning and reassigning of the control signals is done as a part of the original assembly of the optical system.

22. The method of claim 20 wherein the assigning and reassigning of the control signals is done as a part of the continued operation of the optical system in order to compensate for shifts in the alignment of the components of the optical system.

23. An optical system comprising:
   a) an optical signal input, the optical signal input operable to receive an optical signal and to provide as an output a free-space optical signal;
   b) a light modulator, comprising a plurality of modulator elements wherein each modulator element is operable to modulate light, positioned to receive the free-space optical signal and operable to modulate the free-space optical signal based upon modulation control signals to provide a modulated free-space optical signal;
   c) a control circuit in communication with the light modulator, the control circuit operable to generate the modulation control signals for operating the plurality of modulator elements for modulation of the free-space optical signal;
   d) an optical alignment detection circuit in electrical communication with the control circuit, wherein the optical alignment detection circuit detects misalignment in the optical system and together with the control circuit is operable to reassign data signals specified for one set of the modulating elements to another set of the modulating elements so as to adjust the modulation control signals to compensate for such misalignment; and
   e) a light emitting device which generates an alignment optical signal which follows a path that is substantially aligned with the free-space optical signal and the modulated free-space optical signal, wherein the alignment optical signal is received by the optical alignment detection circuit at a point substantially adjacent to the modulated free-space optical signal.

24. An optical system comprising:
   a) an optical signal input, the optical signal input operable to receive an optical signal and to provide as an output a free-space optical signal;
   b) a light modulator, comprising a plurality of modulator elements wherein each modulator element is operable to modulate light, positioned to receive the free-space optical signal and operable to modulate the free-space optical signal based upon modulation control signals to provide a modulated free-space optical signal;
   c) a control circuit in communication with the light modulator, the control circuit operable to generate the modulation control signals for operating the plurality of modulator elements for modulation of the free-space optical signal;
   d) an optical alignment detection circuit in electrical communication with the control circuit, wherein the optical alignment detection circuit detects misalignment in the optical system and together with the control circuit is operable to reassign data signals specified for one set of the modulating elements to another set of the modulating elements so as to adjust the modulation control signals to compensate for such misalignment; and
   e) wherein the light modulator further comprises a non-modulating reflective surface for the reflection of an alignment optical signal.

25. An optical system comprising:
   a) an optical signal input, the optical signal input operable to receive an optical signal and to provide as an output a free-space optical signal;
   b) a light modulator, comprising a plurality of modulator elements wherein each modulator element is operable to modulate light, positioned to receive the free-space optical signal and operable to modulate the free-space optical signal based upon modulation control signals to provide a modulated free-space optical signal;
   c) a control circuit in communication with the light modulator, the control circuit operable to generate the modulation control signals for operating the plurality of modulator elements for modulation of the free-space optical signal;
   d) an optical alignment detection circuit in electrical communication with the control circuit, wherein the optical alignment detection circuit detects misalignment in the optical system and together with the control circuit is operable to reassign data signals specified for one set of the modulating elements to another set of the modulating elements so as to adjust the modulation control signals to compensate for such misalignment; and
   e) wherein the light modulator further comprises a non-modulating transmissive area for the transmission of an alignment optical signal.

* * * * *